United States Patent [19]

Schittino et al.

[11] 4,324,307
[45] Apr. 13, 1982

[54] SNOW/ICE MELTER FOR AUTOMOTIVE VEHICLES

[76] Inventors: Giuseppe Schittino, 2732 Maple Ave.; Vincent Schittino, 2829 Rosalie Ave., both of Baltimore, Md. 21234

[21] Appl. No.: 136,880

[22] Filed: Apr. 3, 1980

[51] Int. Cl.³ .................................................. B60B 39/02
[52] U.S. Cl. ........................................ 180/313; 37/12;
126/271.1; 180/89.2; 280/757; 291/3
[58] Field of Search ................. 180/89.2, 296, 309,
180/313; 280/154.5, 757, 762; 291/1, 3 X, 4, 19;
37/12 X; 126/271.1 X

[56] References Cited

U.S. PATENT DOCUMENTS

| | | | |
|---|---|---|---|
| 1,963,532 | 6/1934 | Sheldon | 291/3 |
| 2,505,311 | 4/1950 | Vinnick | 37/12 |
| 2,515,341 | 7/1950 | Giguere | 126/271.1 |
| 2,558,023 | 6/1951 | Walsh | 126/271.1 |
| 2,560,221 | 7/1951 | Hamblin | 37/12 |
| 3,189,021 | 6/1965 | Giguere | 126/271.1 |
| 3,232,287 | 2/1966 | Gillingham et al. | 126/271.1 |
| 3,289,668 | 12/1966 | Drucker | 126/271.1 |
| 4,063,606 | 12/1977 | Makinson | 291/1 |
| 4,203,423 | 5/1980 | Ricci | 291/3 |

*Primary Examiner*—Joseph F. Peters, Jr.
*Assistant Examiner*—Donn McGiehan
*Attorney, Agent, or Firm*—John F. McClellan, Sr.

[57] ABSTRACT

An improved ice and snow melting system employing motor vehicle hot exhaust gases includes a stub pipe for bolt-on clamping to the rear of a motor vehicle exhaust pipe in parallel-spaced realtion, in forward direction the stub pipe divides in a "Y" shaped configuration; from each arm of the "Y" a flexible tube leads forward and outward to a portion adjustable to heat a vehicle drive wheel and road surface traction area; for valving hot gases from the motor vehicle exhaust into the system a flexible tube is applied in "U" shape and through frictional fit to connect the rear of the vehicle exhaust pipe with the stub-tube; when not in use the flexible tube may be removed and stored in the trunk of the motor vehicle.

9 Claims, 5 Drawing Figures

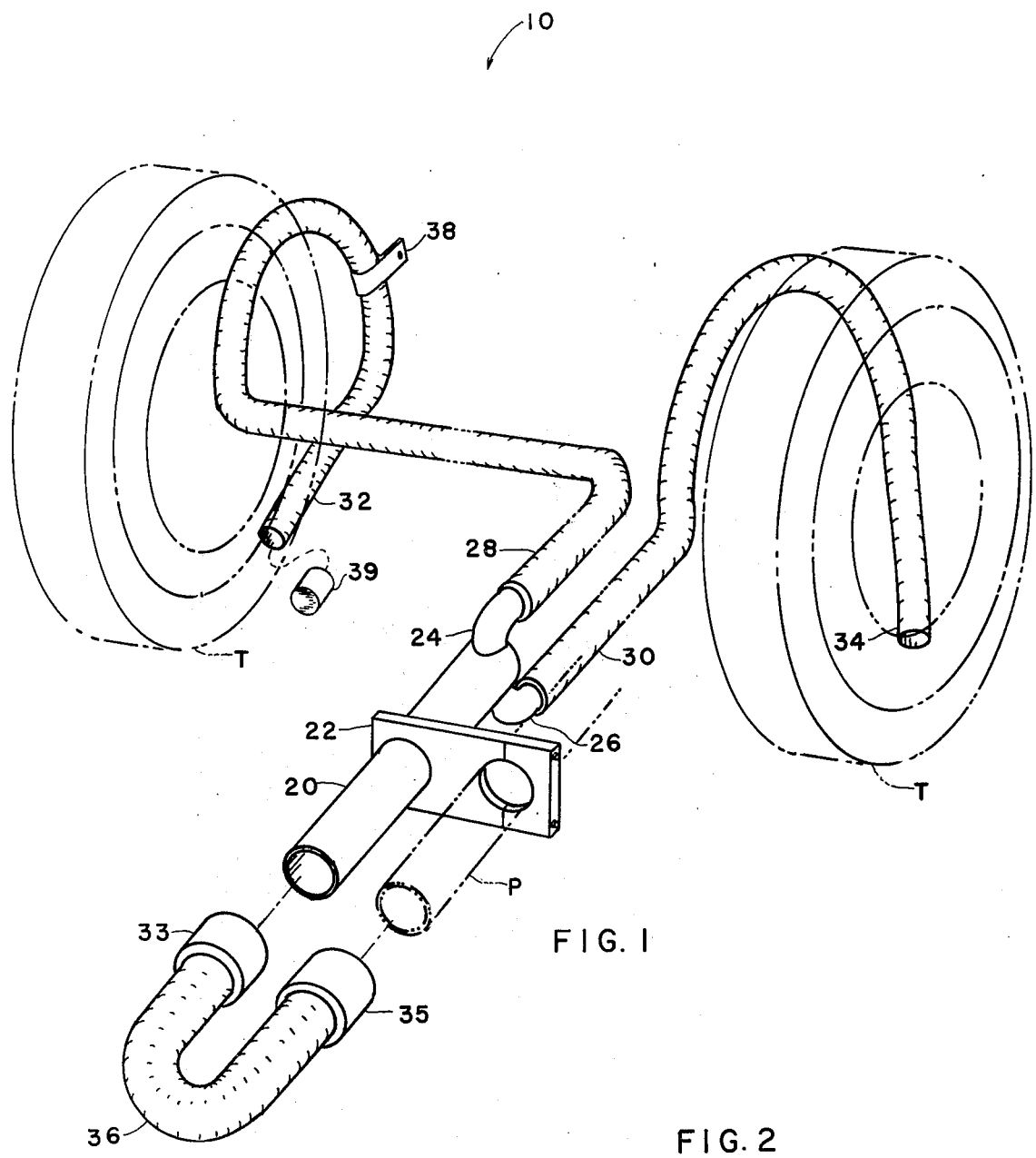
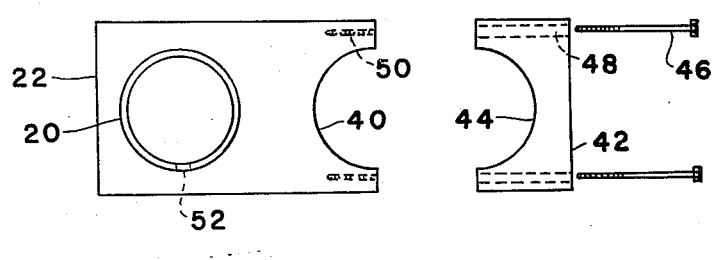

SNOW/ICE MELTER FOR AUTOMOTIVE VEHICLES

This invention relates generally to motor vehicles and specifically to snow and ice removers for the traction surfaces at the drive wheels.

A principal object of the invention is to provide an improved system for ducting engine exhaust to the drive wheel area to melt snow and ice.

In the prior art various hot-gas systems for improving bad weather traction of vehicles have been disclosed, including those in the following U.S. Pat. Nos.;

2,505,311 to W. Vinnick, discloses a system using exhaust gas from the tailpipe directed through flexible pipes and adjustable structure to melt snow ahead of the rear wheels; a means to raise and lower the ends of the pipe ahead of the rear wheels is provided;

2,560,221 to J. L. Hamblin, discloses a burner system for adjustably directing hot gas to the front of each rear wheel of a vehicle;

3,189,021 to P. T. Giguere, discloses a manual system for directing exhaust gas from a tailpipe through a flexible pipe to a hood for melting ice and snow at a rear wheel of a vehicle;

3,232,287 to L. H. Gillingham and William C. Green, Sr., discloses another manual system for directing exhaust gas to the front of the rear wheels of a vehicle; and 3,289,668 to S. Drucker, discloses another system which can direct exhaust gas ahead of drive wheels of a motor vehicle.

However, it is believed that the improvement of this invention in accordance with the objects set out below are new and provide the means of making practical such systems.

Further objects of this invention are to provide a system as described which can easily be installed to fit almost any motor vehicle without modification to either, which is safe, easy, simple and foolproof to operate, which gives clear visual indication of whether the system is in operation, which is adjustable at the output from practically any desired angle of heating of the road and the wheel traction surfaces to an angle clear of the road altogether, and which is economical to purchase, durable, light in weight, self-draining, and which is not unattractive in appearance.

In brief summary given as cursive description only and not as limitation the invention includes a "Y" shaped stub tube for bolted attachment in parallel spacing to a motor vehicle exhaust pipe, flexible tubing connected with the arms of the "Y" for adjustably directing hot exhaust gases from the motor vehicle onto traction surfaces at the drive wheels, and for valving the hot exhaust gases, a quick-attach/detach "U" tube connection of the rear ends of the stub-tube and the motor vehicle exhaust pipe.

The above and other objects and advantages of this invention will become more readily apparent on examination of the following description, including the drawings, in which like reference numerals refer to like parts:

FIG. 1 is a perspective detail of the invention installed at the rear of a motor vehicle which is indicated fragmentarily in phantom lines;

FIG. 2 is an elevational detail of a portion of the invention;

Figure 3:
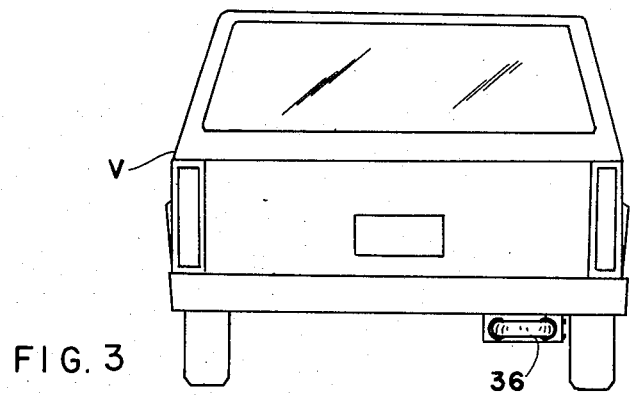
FIG. 3 is a perspective detail of the invention installed in a motor vehicle and in use.

FIG. 1 shows the conduit system 10 of this invention as including a stub tube 20 or rear part supportively held in adjacent parallel-spacing to the rear of a motor vehicle exhaust pipe P (phantom lines) by a clamp 22.

The stub tube forward end has a bifurcate or "Y" configuration. From each arm 24, 26 of the "Y" a respective tube 28, 30, which may be of flexible spiral-wound metal, leads forwardly through middle parts to a respective front part 32, 34 positionable to direct hot exhaust gases onto the traction area of the road and tire T so that ice and snow will be melted. This enables the vehicle to travel more positively and safely on icy hills and the like when the system is in operation.

To put the system in operation a foolproof valve is provided in the form of a quick attach/detach "U" tube connection 36 which slips over the rear ends of the exhaust pipe and the stub tube and ducts exhaust gas into the system of this invention. The "U" tube connection may be of conventional resilient flexible metal hose but preferably is a conventional length of flexible high-temperature rubber radiator hose bent to fit the center distance of the ends which it will unite as a single tubular system. Such hose has reinforcing collars at the ends which are resilient. The resilient first and second front portion or front ends 33, 35 of the "U" tube are selected in size so that they will form a secure friction fit with the rear end of the exhaust pipe and the rear end of the stub tube. Resilience of the tube itself also can tend to prevent vibration from loosening the connection.

The stub tube or rear part of the conduit system may advantageously be of the same diameter as the exhaust pipe (often this diameter is two inches (5 cm)) and may be of steel. Length can be as short as two inches. Center distance between the two parallel tubular members can be three to four inches (7.5 cm to 10 cm), and the length of the "U" tube connection piece can be as short as one foot (30 cm).

The flexible tubes leading forward to the vehicle wheels can be of a diameter permitting the two to carry the same volume of hot gas as the exhaust pipe can carry, although they can be as small as one inch in diameter, the constriction causing acceleration of the flow of hot gases for better projection under the wheels against the traction surfaces, the road and the tire surfaces.

Clips 38 and sheet metal screws adjustably mount the flexible middle parts of the system to the vehicle body, particularly the wheel well liners. About one foot to one and one-half feet (30 cm to 45 cm) of the terminal forward parts is left unsupported to permit adjusting it to desired angle for use and away for storage and greater road clearance. The spiral construction of this conventional material tends to hold the position to which bent.

A further feature appears in FIG. 1 in the form of cup 39. In case the vehicle has one wheel on a dry surface and the other wheel on ice, the cap is placed over the end of one of the front portions, as indicated by the broken line at 32, and all flow of the hot gases is diverted to the wheel which is on the ice, melting the ice even faster. Tight friction fit can hold the cup on the tubular member.

FIG. 2 shows details of the clamp 22, which is a flat plate integral with the stub tube 20 which may pass through it. The free end of the clamp body has a half-circular cut-out 40 to fit the exhaust pipe and a cap 42 which has a similar half-circular cutout 44. Machine screws 46 through clearance holes 48 in the end of the cap pass into threaded holes 50 in the free end of the clamp body and secure the rear part in any desired orientation about the exhaust pipe axis. The clamp unit may be of welded construction.

A drain hole 52 is provided at the lower part of the stub tube to prevent condensed vapor from the engine from passing onto the traction surface. This hole may be ⅛ inch (0.3 cm) in diameter.

FIG. 3 shows that the "U" tube connection 36 when installed presents a neat appearance, giving a clear indication that it is in operating position. Installation or removal takes but a few seconds and can be done from a squatting position behind the car, or a bending position. "V" indicates the vehicle.

Figure 4:
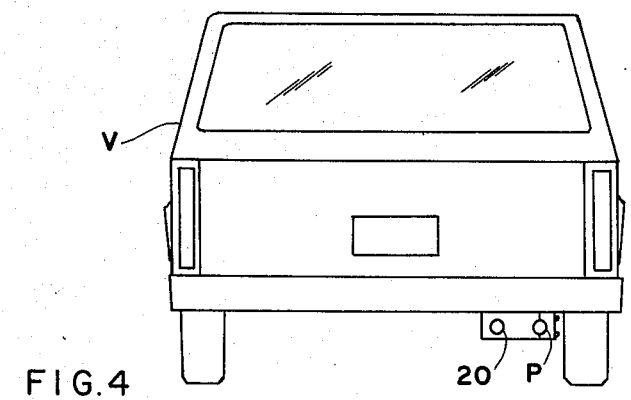
FIG. 4 is a perspective detail of the invention installed in a motor vehicle and not in use.

FIG. 4 shows the neat symmetrical "two exhaust pipe" (20 and P) appearance of the installation when the "U" tube connection is removed and stored in the trunk. Because of the rubber construction of the "U" tube it is less likely to cause injury to the hands of the user when installing and removing.

Figure 5:
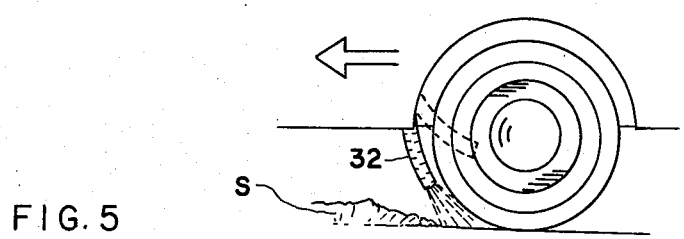
FIG. 5 is a perspective detail of the side of a motor vehicle with the invention in operating position; clearance or storage position appears in broken lines.

FIG. 5 shows the means for directing or forward end 32 of the unit on one side of the vehicle in position for melting ice and snow S. The forward end of the vehicle shown is to the left (arrow). The broken lines indicate the retracted position to which the unit can easily be moved by foot or by hand; if this forward end is hot, the "U" tube connection can be used to push the end upward for storage.

This invention is not construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by Letters U.S. Patent is:

1. In a system for melting snow and ice by directing hot gas from a rearwardly extending motorvehicle exhaust pipe to the traction surfaces at the drive wheels through a conduit system having a rear part with a rear end, a middle part and a front part with distribution means, the improvement comprising: means for adjustably mounting the middle part of the conduit system to a motor vehicle, means for clamping the rear part of the conduit system adjacent the rear end of said exhaust pipe, means for connecting the rear of said exhaust pipe disconnectably to the rear part of the conduit system for ducting the hot gases therethrough, the distribution means including means for adjustably directing the hot gases from the front part of said conduit system to said traction surfaces, said means for connecting comprising a quick attach/detach tubing having first and second ends; the first end having provision for resilient friction-fit over the rear end of a said exhaust pipe, and the second end having provision for resilient friction-fit over the rear end of said rear part of the conduit system.

2. In a system as recited in claim 1, the means for clamping having provision for holding said rear part of the conduit system to the rear end of said exhaust pipe in parallel-spaced relation thereto, and the quick attach/detach tubing being in "U" shape during said connecting.

3. In a system as recited in claim 2, said quick attach/detach tubing being flexible for adjusting to center distance between said rear end of said rear part of the conduit system and the rear end of a said exhaust pipe.

4. In a system as recited in claim 3, the rear end of said rear part having a rigid stub-tube for receiving the second end of the quick attach/detach tubing.

5. In a system as recited in claim 4, the rigid stub tube being integral with a part of the clamping means.

6. In a system as recited in claim 3, the rear end of said rear part of the conduit system having a diameter the same as a diameter of the rear end of a said exhaust pipe, and the quick attach/detach tubing first and second ends having a diameter to fit same.

7. In a system as recited in claim 6, the quick attach/detach tubing being made of a heat-resistant elastomeric compound.

8. In a system as recited in claim 2, the forward part and middle part of the conduit being of flexible metallic tubing.

9. In a system as recited in claim 1, said means for adjustably directing including plural outlets for respective drive wheels, and means for diverting hot gas from one said outlet to another comprising a cup proportioned for retention by tight friction fit over a said outlet.

* * * * *